UNITED STATES PATENT OFFICE.

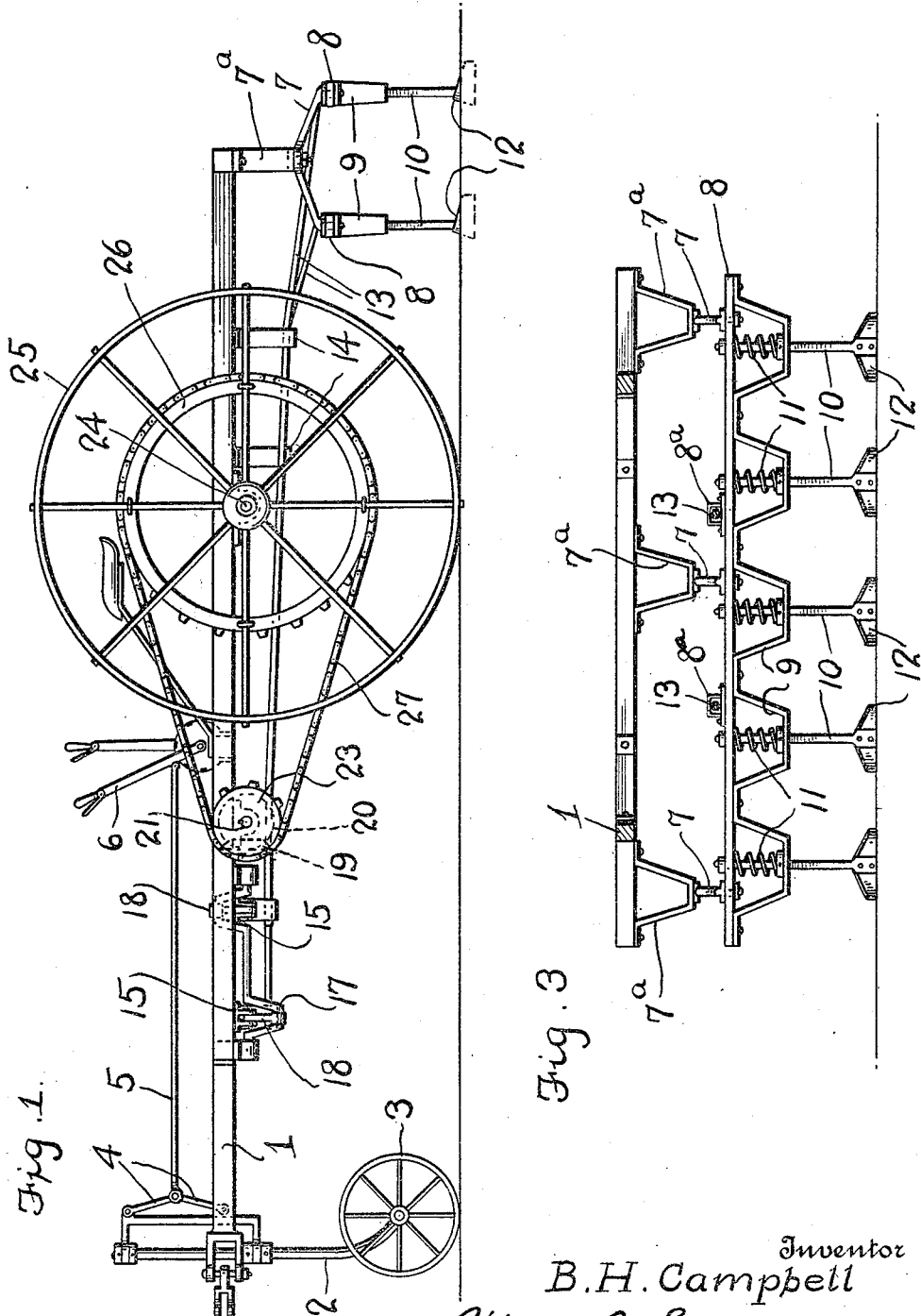

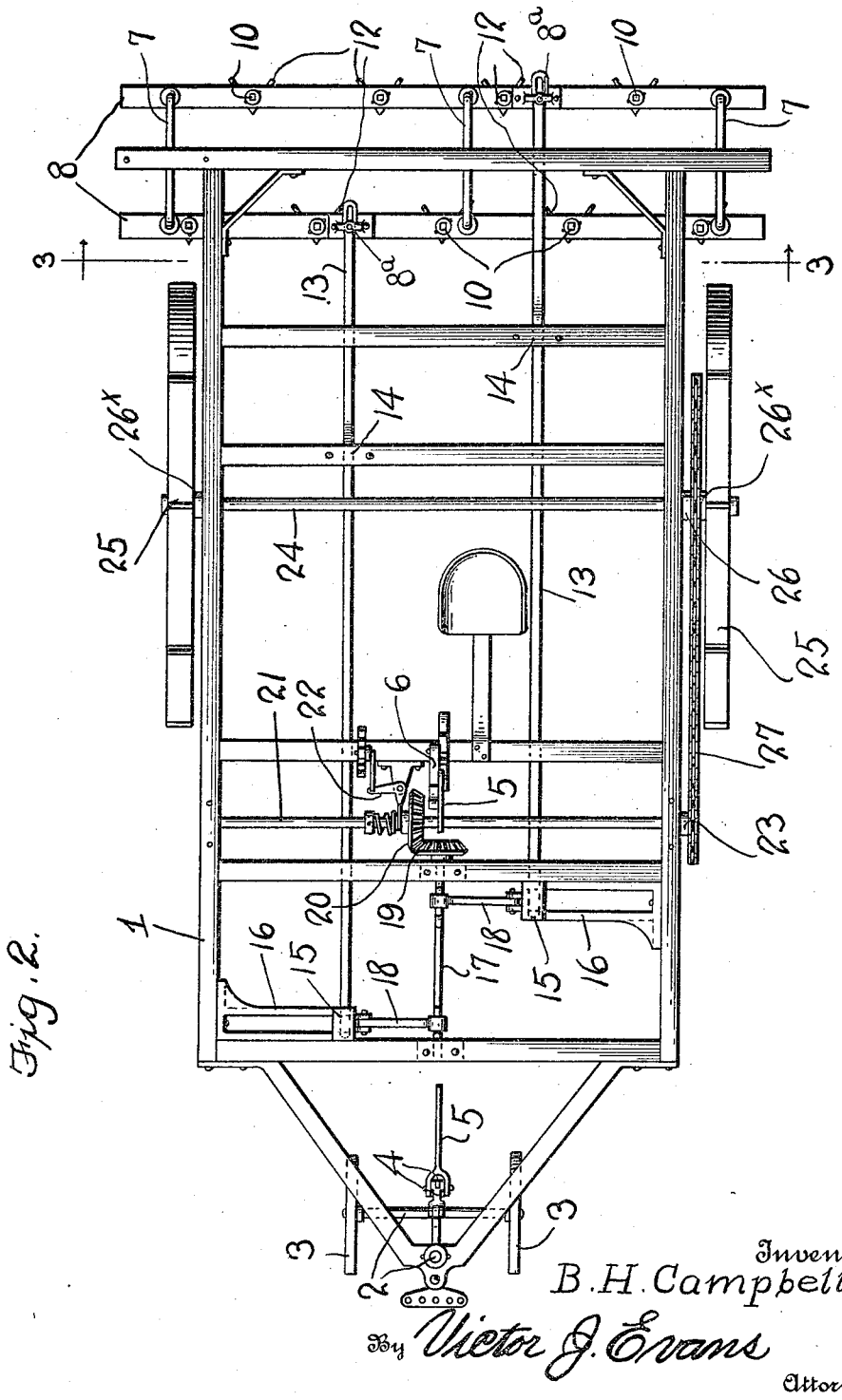

BENJAMIN H. CAMPBELL, OF CHICAGO, ILLINOIS.

HARROW.

1,303,769.  Specification of Letters Patent.  Patented May 13, 1919.

Application filed October 7, 1918. Serial No. 257,237.

*To all whom it may concern:*

Be it known that I, BENJAMIN H. CAMPBELL, a citizen of the United States, residing at Chicago, in the county of Cook and State of Illinois, have invented new and useful Improvements in Harrows, of which the following is a specification.

This invention relates to harrows and it consists in the novel features hereinafter described and claimed.

An object of the invention is to provide a harrow of simple and durable structure having soil engaging elements which are spring supported upon bars and may move vertically.

A further object of the invention is to provide in the harrow means for swinging or moving the bars whereby the soil engaging elements move transversely to the line of draft of the harrow as the harrow moves over the soil.

Another object of the invention is to provide means for raising and lowering the forward portion of the frame of the harrow whereby the soil engaging elements may operate at a desired distance below the surface of the soil.

In the accompanying drawings:—

Figure 1 is a side elevation of the harrow.

Fig. 2 is a top plan view of the same.

Fig. 3 is a transverse section on the line 3—3 of Fig. 2.

Similar numerals of reference designate corresponding parts in all of the views of the drawings.

The harrow comprises a frame 1 which may be composed of strips of metal suitably secured together. A truck 2 is slidably mounted at the forward end of the frame 1 and is supported upon wheels 3. Links 4 are pivotally connected together at their inner ends and the outer end of one link is pivotally connected with the forward portion of the frame 1 and the outer end of the other link 4 is pivotally connected with the upper portion of the truck 2. A rod 5 operatively connects the inner end portions of the links 4 with the intermediate portion of a lever 6 which is fulcrumed upon the frame 1. It is apparent that by swinging the lever 6 the rod 5 may be moved longitudinally whereby the links 4 may be swung with relation to each other and consequently the forward portion of the frame 1 may be raised or lowered with relation to the truck 2 and the wheels 3.

Brackets 7 are pivotally connected to hangers 7ª at the rear portion of the frame 1, and bars 8 are pivotally connected with the end portions of the brackets. Pockets 9 with bores of angular form in cross section are carried by the bars 8, and standards 10, of angular form in cross-section, extend vertically through the pockets and transversely through the bars 8. Springs 11 are housed within the pockets 9 and engage the standards 10. The upper ends of the springs 11 bear against the lower surfaces of the bars 8. Springs 11 are under tension with a tendency to hold the standards 10 in lowered positions in the pockets 9. Shovels or blades 12 are carried at the lower ends of the standards 10. The standards 10 are staggered as shown in Fig. 1.

The rear end portions of rods 13 are longitudinally slotted to receive pins 8ª by which the rods 13 are pivotally connected with the bars 8 and the said rods 13 are connected at points between their ends to the frame 1 as at 14 through the medium of stirrups; the rods 13 being movable endwise through said stirrups. The forward ends of the rods 13 are pivotally connected with blocks 15 which are slidably mounted in guides 16. Incidental to the operation of the machine the bars 8 are oppositely reciprocated. The said guides 16 extend transversely of and are located at the forward portion of the frame 1. A crank shaft 17 is journaled for rotation at the forward portion of the frame 1 and its cranks are operatively connected by means of pitmen 18 with the blocks 15. A beveled pinion 19 is fixed to the rear end of the shaft 17 and meshes with a similar pinion 20 mounted on a journaled shaft 21 which extends transversely across the intermediate portion of the frame 1. A clutch mechanism 22 is provided for fixing the pinion 20 with relation to the shaft 21 whereby the pinion may rotate with the shaft. A sprocket wheel 23 is fixed to one end of the shaft 21. An axle 24 is journaled at the intermediate portion of the frame 1 and ground wheels 26 are mounted upon the end portions of the axle 24. A sprocket wheel 26 is fixed to the side of one wheel 25 and rotates with the same. Ratchets 26ˣ are provided in the hubs of the wheels 26. A chain 27 is trained around the sprocket wheels 26 and 23 and is adapted to transmit rotary movement from the axle 4 to the shaft 21. As the shaft 21 rotates rotary movement is transmitted through the beveled pinion 20 and 19 to the shaft 17 whereby the cranks of the said shafts are carried around the axis thereof and the pitmen 18 are moved longitudinally and the blocks 15 are slid along the guides 16.

Inasmuch as the forward ends of the rods 13 are pivotally connected with the blocks 15 the rods 13 are swung upon their pivotal connection 14 with the frame 1 and consequently the bars 8 are moved transversely with relation to the frame 1 and the brackets 7 are rocked upon their pivotal connections with the frame 1. Therefore the soil engaging elements which are carried by the bars 8 are moved transversely of the line of movement of the harrow and they may operate in the soil to effectually stir the same and break the surface thereof.

Inasmuch as the standards 10 are spring pressed they may move vertically to pass over any obstructions which the blades may encounter.

From the foregoing description it will be seen that a harrow of simple and durable structure is provided and that the same may be economically used to advantage for efficiently breaking or stirring the soil during the operation of harrowing the same.

By reference to Fig. 3 it will be noted that in order to enable the rear ends of the rods 13 to work freely, the said rods are pivoted to and between the bar 8 and stirrups 8ª carried by the bar 8.

Having described the invention what is claimed is:—

1. A harrow comprising a wheel mounted frame, brackets pivoted between their ends thereon, bars pivotally connected with the arms of the brackets, soil engaging elements carried by the bars, rods mounted at intermediate points in their length to swing horizontally upon the frame and having their rear arms pivotally connected with the bars, and means operated from one supporting wheel of the harrow and connected to the forward arms of the rods for swinging said rods.

2. A harrow comprising a wheel mounted frame, brackets pivoted thereon, bars pivotally connected with the brackets, soil engaging elements carried by the bars, rods mounted at intermediate points in their length to swing horizontally on the frame and pivotally connected with the bars, guides mounted upon the frame, blocks slidably mounted in the guides and pivotally connected with the rods and means operated by a supporting wheel of the harrow for sliding the blocks.

3. A harrow comprising a wheel mounted frame, brackets pivoted thereon, bars pivotally connected with the brackets, soil engaging elements carried by the bars, rods mounted at intermediate points in their length to swing horizontally on the frame and pivotally connected with the bars, guides mounted on the frame, blocks slidably mounted in the guides and pivoted to the rods, a crank shaft journaled upon the frame, pitmen operatively connecting the cranks of the shaft with the blocks, and a drive shaft mounted upon the frame and operatively connected with the crank shaft and means for rotating the drive shaft from one supporting wheel of the harrow.

In testimony whereof I affix my signature.

BENJAMIN H. CAMPBELL.

Copies of this patent may be obtained for five cents each, by addressing the "Commissioner of Patents, Washington, D. C."